US008739617B2

(12) United States Patent
Keister et al.

(10) Patent No.: US 8,739,617 B2
(45) Date of Patent: Jun. 3, 2014

(54) GE EVOLUTION SERIES POWER ASSEMBLY TEST STAND SYSTEM AND METHOD

(75) Inventors: Patrick E. Keister, Vinton, VA (US); Jeff M. Cutright, Roanoke, VA (US)

(73) Assignee: Norfolk Southern Corporation, Norfolk, VA (US)

(*) Notice: Subject to any disclaimer, the term of this patent is extended or adjusted under 35 U.S.C. 154(b) by 258 days.

(21) Appl. No.: 13/294,638

(22) Filed: Nov. 11, 2011

(65) Prior Publication Data

US 2012/0118055 A1 May 17, 2012

Related U.S. Application Data

(60) Provisional application No. 61/413,028, filed on Nov. 12, 2010, provisional application No. 61/413,568, filed on Nov. 15, 2010.

(51) Int. Cl.
*G01M 15/02* (2006.01)

(52) U.S. Cl.
USPC ...................................... 73/116.02

(58) Field of Classification Search
USPC ............... 73/114.77, 114.79, 116.01, 116.02, 73/116.04
See application file for complete search history.

(56) References Cited

U.S. PATENT DOCUMENTS

| | | | |
|---|---|---|---|
| 4,206,634 A * | 6/1980 | Taylor et al. | 73/114.41 |
| 4,594,882 A | 6/1986 | Wheeler | |
| 5,007,284 A | 4/1991 | Slone | |
| 5,515,821 A | 5/1996 | Wolck, Jr. | |
| 5,569,841 A | 10/1996 | Hoban et al. | |
| 6,050,230 A | 4/2000 | Seiler et al. | |
| 6,318,308 B1 | 11/2001 | Hsu et al. | |
| 6,325,050 B1 | 12/2001 | Gallagher et al. | |
| 6,571,776 B1 | 6/2003 | Dunsworth | |
| 6,994,316 B2 | 2/2006 | Pervaiz | |
| 7,069,140 B2 | 6/2006 | Sheikh et al. | |
| 7,155,330 B2 | 12/2006 | Dunsworth et al. | |
| 7,234,449 B2 | 6/2007 | Casabianca et al. | |
| 7,677,217 B2 | 3/2010 | Kumar et al. | |
| 7,726,182 B1 * | 6/2010 | Newlin et al. | 73/116.02 |
| 8,418,540 B2 * | 4/2013 | Schrotter | 73/116.02 |
| 2002/0170344 A1 * | 11/2002 | Pallozzi | 73/116 |
| 2005/0016295 A1 | 1/2005 | Kemnade | |
| 2005/0044933 A1 * | 3/2005 | Laws | 73/117.3 |
| 2006/0086327 A1 * | 4/2006 | Flynn et al. | 123/41.84 |
| 2012/0234266 A1 * | 9/2012 | Faulkner et al. | 123/41.1 |

* cited by examiner

*Primary Examiner* — Eric S McCall
(74) *Attorney, Agent, or Firm* — Goodwin Procter LLP

(57) ABSTRACT

A system and method for testing and maintaining a power assembly of a locomotive diesel engine. In one embodiment of the invention, the testing apparatus comprises: a first test position for securing a strongback of a power assembly; a second test position for securing a cylinder head of the power assembly; and a third test position for securing a cylinder liner. In another embodiment of the invention, the testing method comprises: securing a power assembly to a first test position; removing a cylinder head from the power assembly; securing the cylinder head to a second test position; removing a cylinder liner from the strongback assembly; placing the cylinder liner into the third test position; cleaning the cylinder liner; testing the cylinder head for possible leakage; and re-assembling the power assembly cylinder head passes the leakage tests.

6 Claims, 4 Drawing Sheets

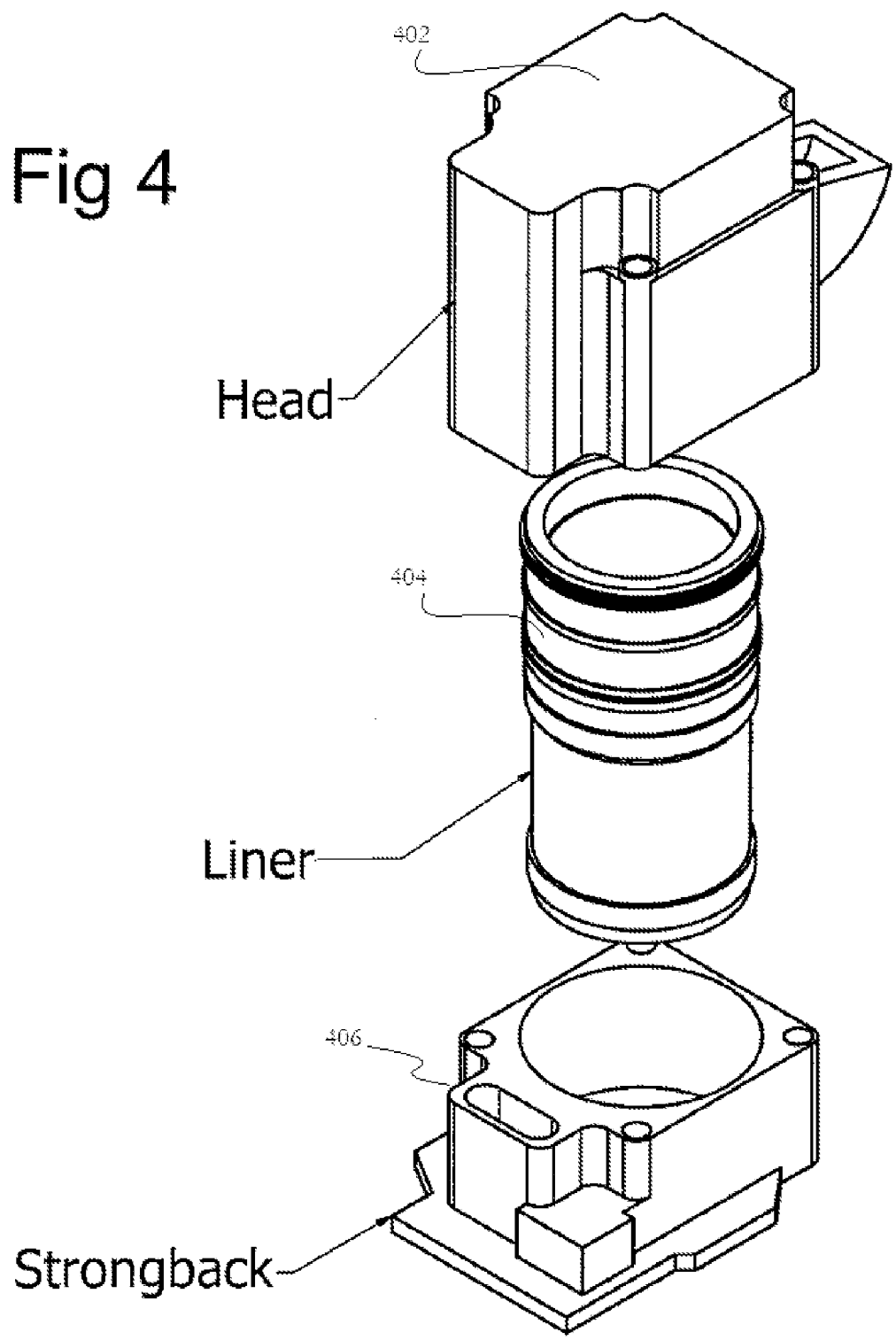

GE EVOLUTION SERIES POWER ASSEMBLY TEST STAND SYSTEM AND METHOD

CROSS REFERENCE TO RELATED APPLICATIONS

This patent application claims priority to U.S. Provisional Application No. 61/413,028, entitled "System and Method for Split Cooling an Engine", filed Nov. 12, 2010, and U.S. Provisional Application No. 61/413,568, entitled "GE Evolution Series Power Assembly Test Stand System and Method", filed Nov. 15, 2010, both of which are hereby incorporated by reference herein in their entirety.

TECHNICAL FIELD

The present invention is in the field of diesel engine and power assembly testing, qualifying and repairing. More particularly, the present invention is in the technical field of systems and methods in testing and analyzing performance and integrity of diesel engine power assemblies.

BACKGROUND OF THE INVENTION

Many medium speed diesel engines have a cylinder assembly often referred to by mechanics and the manufacturers as a "power assembly". The power assembly often consists of several subcomponents which are typically replaced as a unit on the engine to expedite repairs and to assure the integrity of the assembled replacement parts. In the case of the General Electric Evolution Series engine, the power assembly consists of a cylinder head (complete with intake and exhaust valves), a cylinder liner, a piston with compression rings, a crankshaft connecting rod attached to the piston and a "strongback". The strongback is a casting which the cylinder head attaches to with bolts. The strongback holds the cylinder liner by way of an interference fit between its bore and the outside diameter of the cylinder liner. Also, the strongback holds the high pressure fuel pump, intake and exhaust cam followers. The strongback assembly, including the head in turn is secured to the engine block with four large hold down studs. A fuel injection nozzle is mounted in the cylinder head. The piston with its rings assumes a reciprocating motion based on the rotational movement of the crankshaft's eccentric lobes or throws. The piston rings and cylinder liner are primary wear parts and require periodic replacement, most often at a prescribed interval characterized as an engine overhaul.

Water circulates between the outside of the cylinder jacket and the inside bore of the strongback in a cavity to remove the heat of combustion so as to promote engine bearing life and overall performance. There are two O-rings placed in grooves on the outside diameter of the cylinder liner that contain the cooling water and isolate the water so as to prevent contamination with the lubricating oil in the crankcase below.

Unfortunately, these O-rings are inclined to fail prematurely, resulting in significant water leaks. Due to the absence of any low water detection device, the Evolution engine can operate with little or no cooling water. This can result in cracks on the firing face of the cylinder head and exhaust valve seats, creating additional water leaks. These water leaks are not readily detectable because the heat of combustion creates steam which in turn is conducted out the exhaust valves to the exhaust manifold and turbocharger.

One current method of dealing with this significant problem of cylinder O-ring failures is a procedure in which the cylinder heads are removed from the strongback while the engine remained in the locomotive car body. The cylinder liner is then forced out of the bore of the strongback using the rotation of the crankshaft as the piston comes up against a fixture placed in the liner bore. This allows replacement of the failed O-rings on the lower, outside diameter of the cylinder liner, after which, the liner is forced back into position within the strongback using power wrenches to drive threaded nuts downward on the four hold-down studs.

This method has two serious drawbacks. First, it offers no opportunity to assess if the cylinder head is leaking, another potentially prevalent source of internal water leaks. Secondly, aside from being an awkward, labor intensive process, the method is disadvantageous because of its unfortunate tendency to damage the newly applied liner O-rings as the cylinder liner re-entered the bore of the strongback. This often results in an unacceptable success rate for the repair process.

The disclosed system and methods of testing and disassembling the power assembly is directed to overcoming one or more of the problems listed above.

SUMMARY OF THE INVENTION

In one aspect, the present invention disclosed herein is directed to a system and method for testing, qualifying and maintaining a power assembly of a locomotive diesel engine. In one embodiment of the invention, the testing apparatus comprises: a first test position for securing a strongback of a power assembly; a second test position for securing a cylinder head of the power assembly; and a third test position for securing a cylinder liner.

In another aspect, the present invention disclosed herein is directed to a method for testing a power assembly of a locomotive diesel engine, comprising the steps of: securing a power assembly to a first test position; removing a cylinder head from the power assembly; securing the cylinder head to a second test position; removing a cylinder liner from the strongback; securing the cylinder liner to a third test position; cleaning and qualifying the cylinder liner; testing the cylinder head for possible leakage; and re-assembling the power assembly if the cylinder liner is reusable and the cylinder head passes the leakage tests.

BRIEF DESCRIPTION OF THE DRAWINGS

FIG. 4 is an exploded view of a power assembly according to one embodiment of the present invention.

DETAILED DESCRIPTION OF THE INVENTION

The present application is directed toward a system and method of testing, cleaning, qualifying disassembling, and reassembling the power assembly of a diesel engine, such as a diesel locomotive engine.

Figure 1:
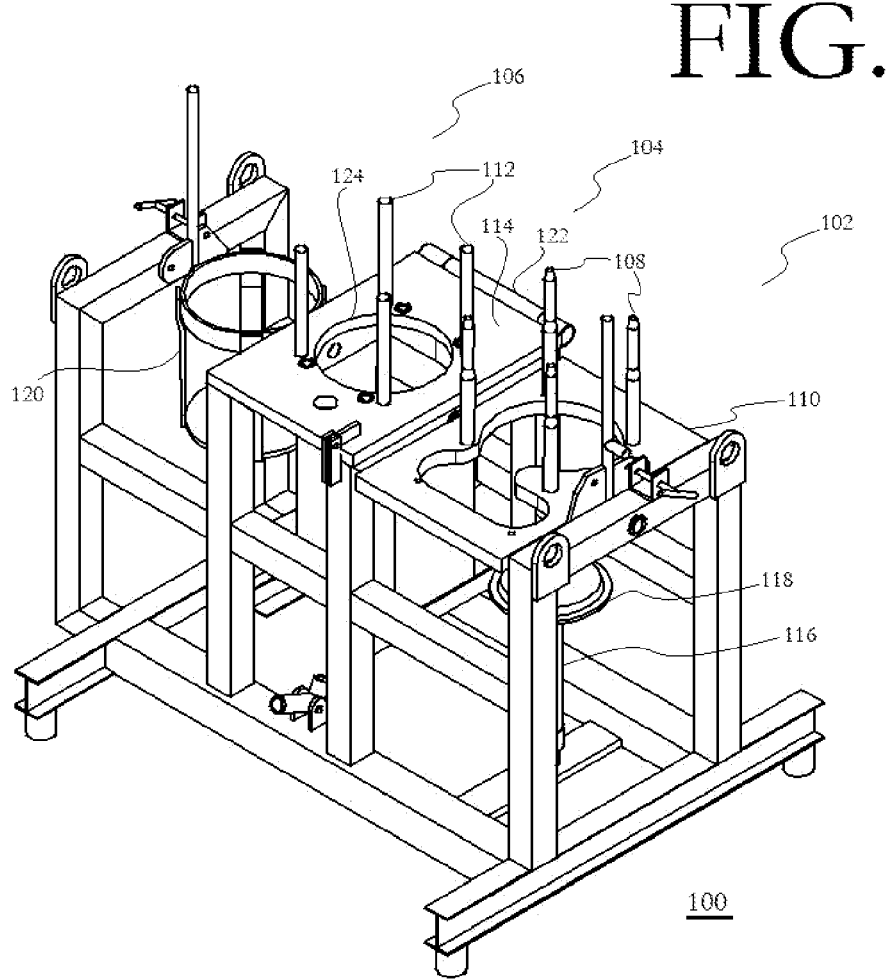
FIG. 1 is a diagonal view of one preferred embodiment according to the present invention.
Figure 2:
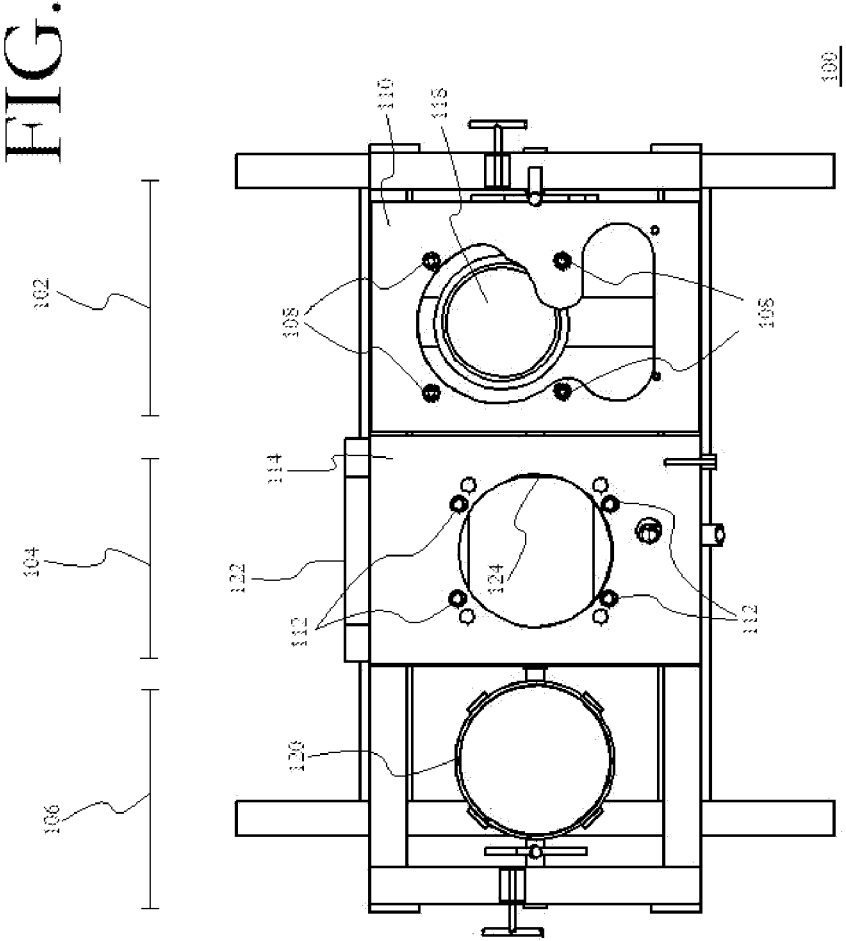
FIG. 2 is a top view of one preferred embodiment according to the present invention.
Figure 3:
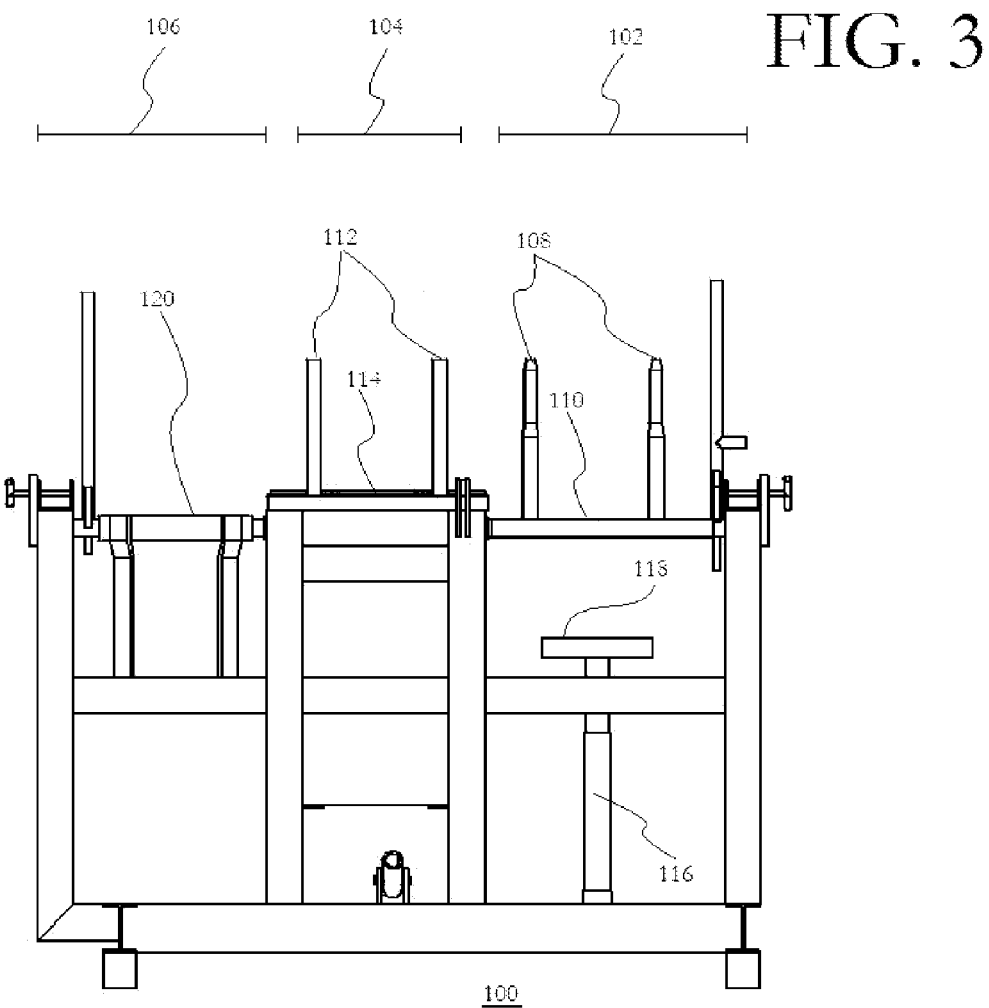
FIG. 3 is a side view of one preferred embodiment according to the present invention.

Referring now to FIG. 1, FIG. 2, and FIG. 3 one embodiment of a system of the present invention is depicted. A test device 100 contains a plurality of test positions 102, 104, 106. Each test position is used for at least one specific step in the power assembly testing or qualifying procedure, which is described in detail below.

Referring now to FIG. 4, an exploded view of an exemplary power assembly to be disassembled, tested, cleaned, and qualified by the present invention is depicted. A liner 404 is secured in a strongback 406 and covered and secured by a cylinder head 402.

The test device 100 permits required maintenance and testing to be performed outside the engine room and off the engine block. With the test device 100, the power assembly is removed from the engine and placed in a first test position 102. The power assembly is secured to the test device 100 by a plurality of vertical pins 108 which extend perpendicular from planar face 110 of first test position 102. Other means of holding the parts in place include air or hydraulic actuated cylinders. With the strongback in the first test position 102, the strongback, the cam followers, and the high pressure fuel pump can be inspected and replaced easily due to variable positioning available in the fixture.

The cylinder head is then unbolted from the strongback and placed in second test position 104. They cylinder head is secured to the test device 100 by a plurality of vertical pins 112 which extend perpendicular from planar face 114 of second test position 104. Next a vertically mounted hydraulic cylinder 116 and push plate 118 force the cylinder liner out of the strongback.

The cylinder liner is then placed in a third test position 106 for O-ring removal, inspection and cleaning. A liner support 120 at third test position 106, and the planar face 110 at first test position 102 may rotate about a coplanar axis to allow complete access for maintenance, inspection, and cleaning of the respective parts of the power assembly. Replacement O-rings may then be applied to the O-ring grooves on the cylinder liner while it rests in liner support 120. The cylinder head placed at second test position 104 may be resting on planar surface 114, which may have the ability to tilt about a hinge 122. While this planar surface 114 is initially horizontal, the hinge 122 on one side enables a hydraulic cylinder (not shown) mounted below to raise the cylinder head such that the firing face is at an angle to the horizontal plane. The planar face 114 is designed in such a fashion that inspection ports 124 allow a visual inspection of the firing face while the cylinder head is supported in this inclined position.

The second test position 104 of the test device 100 may be equipped with piping connections such that both compressed air and fluids are available for application to the cooling water passages of the cylinder head. Initially, compressed air is applied to the cooling water passages of the cylinder head while it rests on the tilt table in its horizontal orientation. Fluid is then inserted into the exhaust passages of the cylinder head. If air bubbles are observed during an observation period, the cylinder head is defective in that cracks in the casting or gaps in the parts fits have compromised the integrity of the water passages. The parts can be measured or qualified in any of the positions. With all three of the major components disassembled, there may be an opportunity for future measurements and qualifications of the components.

If the cylinder head passes the aforementioned test, fluid under pressure is then applied to the fluid passages of the cylinder head. Next, the cylinder head is tilted upward to allow visual inspection of the firing face of the cylinder head. If fluid leaks appear on the firing face, or other parts of the head assembly the cylinder head is determined to be defective. Any mechanical defects in the head assembly or on the face of the head could be detected, but other defects would be to identify any fluid leaking from the injector sleeve area of the head face as well as the exhaust valve seat areas.

If the cylinder head fails any qualification or either test, it is either repaired or removed from second test position 104 and a replacement cylinder head of known quality is placed in second test position 104 and used to replace the failed cylinder head during re-assembly of the power assembly.

With a qualified cylinder head at second test position 104, a qualified cylinder liner at third test position 106, and a qualified strongback in the first test position 102, the re-assembly process for the power assembly may begin. The cylinder liner from third test position 106 is first placed in the bore of the strongback at first test position 102 where a clamping mechanism processes the cylinder liner back into the bore of the strongback. Next, the cylinder head from second test position 104 is placed on top of the strongback at first test position 102 where bolt fasteners are reapplied and appropriately torqued to prescribed levels of tension.

The embodiments described above are given as illustrative examples only. It will be readily appreciated by those skilled in the art that many deviations may be made from the specific embodiments disclosed in this specification without departing from the invention. Accordingly, the scope of the invention is to be determined by the claims below rather than being limited to the specifically described embodiments above.

What is claimed is:

1. A testing apparatus for a diesel engine power assembly, the testing apparatus being separate and apart from the diesel engine power assembly tested and comprising:
    a first portion providing a first test position for securing a strongback of the power assembly, wherein the first portion comprises a first planar surface and a plurality of vertical pins or air—or hydraulically—actuated cylinders to secure the strongback;
    a second portion providing a second test position for securing a cylinder head of the power assembly, wherein the second portion comprises a second planar surface and a plurality of vertical pins or air—or hydraulically—actuated cylinders to secure the cylinder head, and wherein the second planar surface of the second portion is movable about a hinge attached to a planar edge of the second planar surface; and
    a third portion providing a third test position for securing a cylinder liner, wherein the third portion comprises a cylinder liner support.

2. The testing apparatus of claim 1, wherein at least a part of the first portion rotates along a coplanar axis.

3. The testing apparatus of claim 1, wherein the second planar surface of the second portion is movable about a hinge attached to a planar edge of the second planar surface.

4. The testing apparatus of claim 1, wherein the cylinder liner support of the third portion rotates along an axis radial to the cylinder liner.

5. A method of testing a locomotive diesel engine power assembly, comprising:
    a) securing a power assembly including a strongback to a first test position of a test stand;
    b) removing a cylinder head from the power assembly while the strongback of the power assembly is secured to the first test position of the test stand;
    c) securing the cylinder head to a second test position of the test stand;
    d) removing a cylinder liner from the strongback; and
    e) securing the cylinder liner to a third test position of the test stand.

6. The method of claim 5, further comprising the steps of:
    cleaning and qualifying the cylinder liner for possible damage and leakage;
    testing the cylinder head for possible damage and leakage; and re-assembling the power assembly if the cylinder liner qualifies and the cylinder head passes leakage tests.

* * * * *